US011113166B2

(12) United States Patent
Yang et al.

(10) Patent No.: US 11,113,166 B2
(45) Date of Patent: Sep. 7, 2021

(54) MONITORING SYSTEM AND METHOD WITH BASEBOARD MANAGEMENT CONTROLLER

(71) Applicant: Wiwynn Corporation, New Taipei (TW)

(72) Inventors: Bing-Han Yang, New Taipei (TW); Po-Shen Kuo, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 160 days.

(21) Appl. No.: 16/206,295

(22) Filed: Nov. 30, 2018

(65) Prior Publication Data

US 2020/0110678 A1 Apr. 9, 2020

(30) Foreign Application Priority Data

Oct. 5, 2018 (TW) .................................. 107135209

(51) Int. Cl.
*G06F 11/00* (2006.01)
*G06F 11/22* (2006.01)
*G06F 11/36* (2006.01)
*G06F 11/30* (2006.01)
*G06F 13/42* (2006.01)
*G06F 11/07* (2006.01)

(52) U.S. Cl.
CPC ...... *G06F 11/2294* (2013.01); *G06F 11/0748* (2013.01); *G06F 11/3013* (2013.01); *G06F 11/3656* (2013.01); *G06F 13/4282* (2013.01); *G06F 2201/875* (2013.01)

(58) Field of Classification Search
CPC combination set(s) only.
See application file for complete search history.

(56) References Cited

U.S. PATENT DOCUMENTS

| 10,628,176 B1 * | 4/2020 | Santharam .............. G06F 13/36 |
| 10,649,792 B1 * | 5/2020 | Kulchytskyy ............. G06F 8/65 |
| 10,698,788 B2 * | 6/2020 | Yeh ...................... G06F 11/3031 |
| 2008/0313312 A1 | 12/2008 | Flynn et al. |
| 2012/0144223 A1 * | 6/2012 | Kasahara ............ G06F 11/2023 713/340 |
| 2013/0138988 A1 * | 5/2013 | Hsien ...................... G06F 1/189 713/340 |
| 2014/0337656 A1 * | 11/2014 | Huang ................ G06F 11/3062 713/340 |
| 2015/0309553 A1 * | 10/2015 | Huang .................. G06F 1/3206 713/322 |
| 2015/0355651 A1 * | 12/2015 | Balakrishnan .......... G06F 1/206 700/299 |

(Continued)

OTHER PUBLICATIONS

Office Action dated Jul. 17, 2019 in corresponding Taiwan Patent Application No. 107135209.

*Primary Examiner* — Amine Riad
(74) *Attorney, Agent, or Firm* — Donald E. Stout; Stout, Uxa & Buyan, LLP

(57) ABSTRACT

A monitoring system includes a baseboard management controller (BMC) disposed on a same baseboard as a system under test; an administrator device electrically connected to the BMC; and a software test fixture stored in the BMC, the software test fixture generating an electrical signal, which is transferred to a corresponding target device of the system under test to access a register of the corresponding target device.

17 Claims, 3 Drawing Sheets

(56) References Cited

U.S. PATENT DOCUMENTS

| | | | |
|---|---|---|---|
| 2016/0283424 A1* | 9/2016 | Richardson | G06F 11/301 |
| 2017/0097880 A1* | 4/2017 | Yeh | G06F 11/3031 |
| 2017/0139797 A1* | 5/2017 | Wang | G06F 11/3055 |
| 2018/0288090 A1* | 10/2018 | Olarig | H04L 63/1458 |
| 2018/0293147 A1* | 10/2018 | Bikumala | G06N 20/00 |
| 2019/0220340 A1* | 7/2019 | Chou | G06F 11/1441 |

* cited by examiner

MONITORING SYSTEM AND METHOD WITH BASEBOARD MANAGEMENT CONTROLLER

CROSS-REFERENCE TO RELATED APPLICATIONS

This application claims priority of Taiwan Patent Application. No. 107135209, filed Oct. 5, 2018, the entire contents of which are herein expressly incorporated by reference.

BACKGROUND OF THE INVENTION

1. Field of the Invention

The present invention generally relates to a monitoring system, and more particularly to a remote monitoring system using a baseboard management controller (BMC).

2. Description of Related Art

A computer system such as a server may include many hardware structures and software functions. Malfunction, error or even crash may occasionally arise in the computer system, particularly the firmware portion, either on testing stage in manufacture or on managing stage in use. As a result, a variety of debug tools have been proposed. While executing debug, it is a common requirement that power should be shut down first and the case should be opened (or even the mainboard need be removed) before a debug header is connected to perform debugging. Therefore, error history of the server cannot be recorded when the power is shut down, thus increasing the difficulty of debugging.

Intelligent Platform Management Interface (IPMI) provides a debug architecture without power interruption, in which a baseboard management controller (BMC) is embedded and some sensors are built to sense parameters such as temperature, fan speeds, power status or operating system (OS) status in the server. The BMC monitors the sensors, and sends alerts to a system administrator to timely carry out corrective actions when the parameters become abnormal.

In a conventional debugging procedure, a physical test fixture should be connected to a system under test. However, conventional test fixtures are bulky and cumbersome. Moreover, it is inconvenient for a tester to bring the test fixture on the scene to perform debugging. Further, debug results made using different test fixtures may probably inconsistent.

A need has thus arisen to propose a novel test fixture to overcome the drawbacks of the conventional test fixtures.

SUMMARY OF THE INVENTION

In view of the foregoing, it is an object of the embodiment of the present invention to provide a firmware program that acts as a virtual test fixture to achieve remote monitor, operation and debug.

According to one embodiment, a monitoring system includes a baseboard management controller (BMC), an administrator device and a software test fixture. The BMC is disposed on a same baseboard as a system under test. The administrator device is electrically connected to the BMC. The software test fixture is stored in the BMC, and generates an electrical signal, which is transferred to a corresponding target device of the system under test to access a register of the corresponding target device.

According to another embodiment, a monitoring method includes the following steps. A software test fixture associated with a corresponding target device of a system under test is provided, the software test fixture being stored in a baseboard management controller (BMC). A user interface of an administrator device is opened, and the corresponding target device is selected. The administrator device is electrically connected to the BMC, and the software test fixture is activated. A register of the corresponding target device is accessed through the user interface.

DETAILED DESCRIPTION OF THE INVENTION

Figure 1:
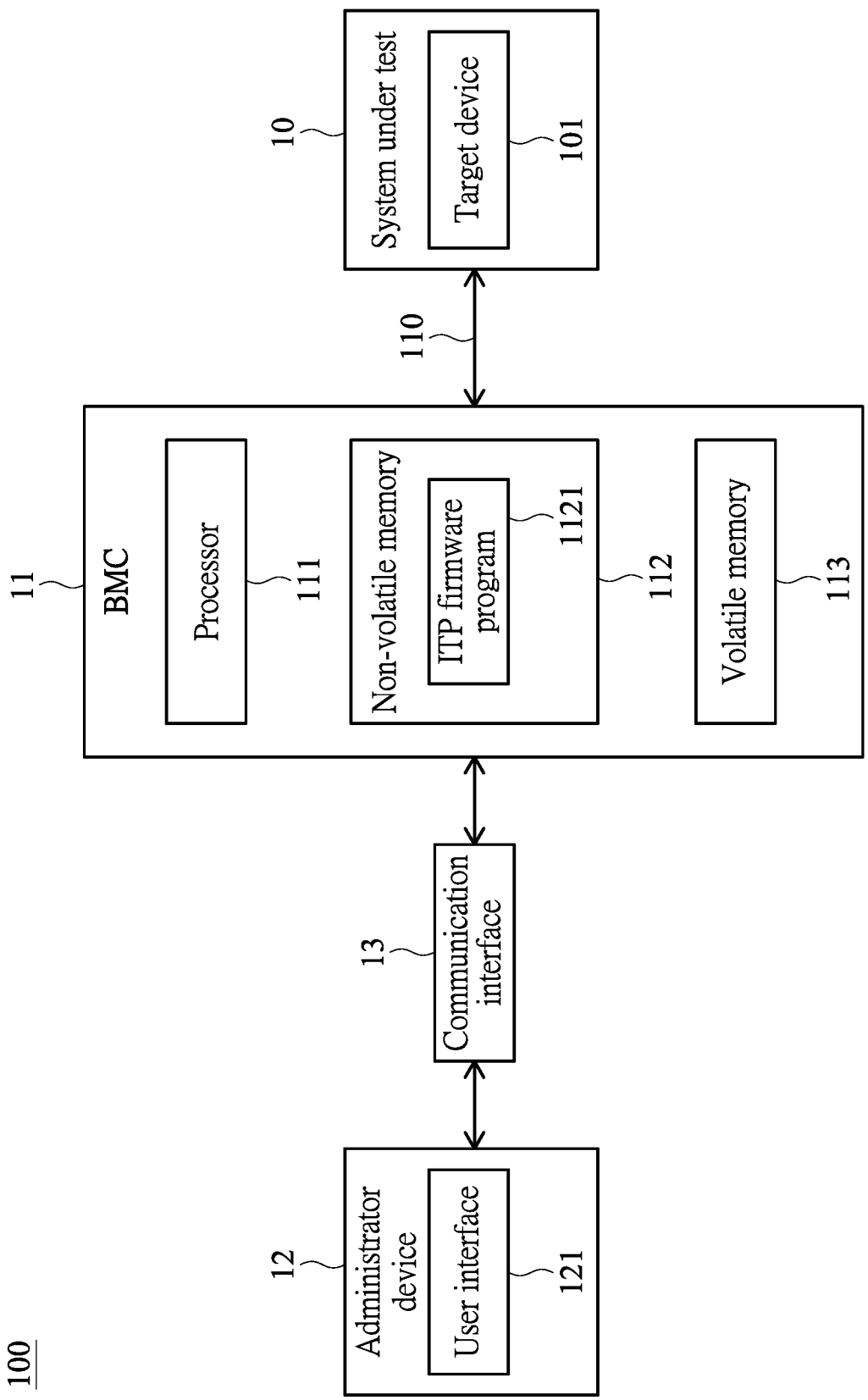
FIG. 1 shows a block diagram illustrating a monitoring system according to a first embodiment of the present invention.

FIG. 1 shows a block diagram illustrating a monitoring system 100 adaptable to debugging or controlling a system under test 10 according to a first embodiment of the present invention. The system under test 10 may include, for example, a server. In the embodiment, the monitoring system 100 may include a baseboard management controller (BMC) 11 disposed on a same baseboard as the system under test 10. The BMC 11 is a main component under the architecture of Intelligent Platform Management Interface (IPMI), and is configured to collect or set the configuration or setting of the system under test 10 or to collect debug information of the system under test 10. For example, the BMC 11 may collect or set the configuration or setting of a central processing unit (CPU) or a register. In the specification and claims, the BMC is not limited to Intelligent Platform Management Interface (IPMI), but may be a baseboard management controller under other similar architectures.

An inter-board communication bus 110 may be disposed between the BMC 11 and the system under test 10, and may be configured to transfer data between the BMC 11 and the system under test 10. In one example, the inter-board communication bus 110 may include a serial communication bus such as, but not limited to, Inter-Integrated Circuit (I2C or I$^2$C).

The monitoring system 100 of the embodiment may include an administrator device 12 (e.g., computer) electrically connected to the BMC 11 via a communication interface 13, which facilitates transmitting and receiving data between the administrator device 12 and the BMC 11. In one embodiment, the communication interface 13 may include a computer network such as the Internet. The computer network may include a wired network, a wireless network or their combination. In another embodiment, the communication interface 13 may include cables and connectors of a communication bus such as Universal Serial Bus (USB). Accordingly, the administrator device 12 may remotely monitor the operation of the system under test 10 in an interruption-free power environment, find the cause of an error when the error happens, or update firmware of the system under test 10 when it is needed. Therefore, the monitoring system 100 of the embodiment may provide accessibility, by which any administrator device 12 may be easily connected to the BMC 11 to remotely monitor the system under test 10.

In the embodiment, the BMC 11 may include a processor 111, a non-volatile memory 112 (e.g., Read-Only Memory (ROM) or flash memory) and a volatile memory 113 (e.g., Random-Access Memory (RAM)). The non-volatile memory 112 may be used to store a firmware program executable by the processor 111. An executed result from the processor 111 or data received by the BMC 11 may be temporarily stored in the volatile memory 113.

According to one aspect of the embodiment, the non-volatile memory 112 of the BMC 11 may store a soft test fixture, such as an in-target probe (ITP) firmware program 1121, used to control a target device 101 in the system under test 10 at a register level. The target device 101 may include a standard integrated circuit (e.g., a central processing unit (CPU)) or an Application-Specific Integrated Circuit (ASIC). In the embodiment, the ITP firmware program 1121 may generate an electrical signal, which is transferred to the target device 101 (of the system under test 10) via the inter-board communication bus 110 to access a register, a program counter (PC) and/or an instruction of the target device 101. Accordingly, the software test fixture of the embodiment may replace a conventionally bulky and cumbersome hardware test fixture to achieve the object of remote monitor, operation and debug. The software test fixture of the embodiment may act as a virtual test fixture used to remotely monitor and control the target device 101 of the system under test 10 via a network. In other words, when monitoring the target device 101, the monitoring system 100 of the embodiment includes no physical or hardware test fixture. Accordingly, the monitoring system 100 of the embodiment may provide consistency, by which the debug results individually made may be consistent. Moreover, the embodiment may simplify system design, reduce manufacturing cost, and provide data accuracy. Therefore, the monitoring system 100 of the embodiment may provide efficiency, by which the system under test 10 may be monitored at less time and lower cost.

In the embodiment, the ITP firmware program 1121 may be stored in the non-volatile memory 112 of the BMC 11 before leaving the factory. The ITP firmware program 1121 may be activated or enabled in either software or hardware manner before executing corresponding monitor. In one example, the administrator device 12 may issue a command to the BMC 11 via the communication interface 13 to activate the ITP firmware program 1121. In another example, the system under test 10 or the BMC 11 may activate the ITP firmware program 1121 in either software or hardware manner. In a further example, the ITP firmware program 1121 may be transmitted to and stored in the non-volatile memory 112 or the volatile memory 113 after leaving the factory (or when in use).

As stated above, the ITP firmware program 1121 of the embodiment may act as a virtual test fixture used to remotely monitor and control the target device 101 of the system under test 10. The content of the register, the program counter and/or the instruction of the target device 101 under monitor may be shown in a user interface (e.g., graphical user interface (GUI)) 121 on a display of the administrator device 12.

Figure 2:
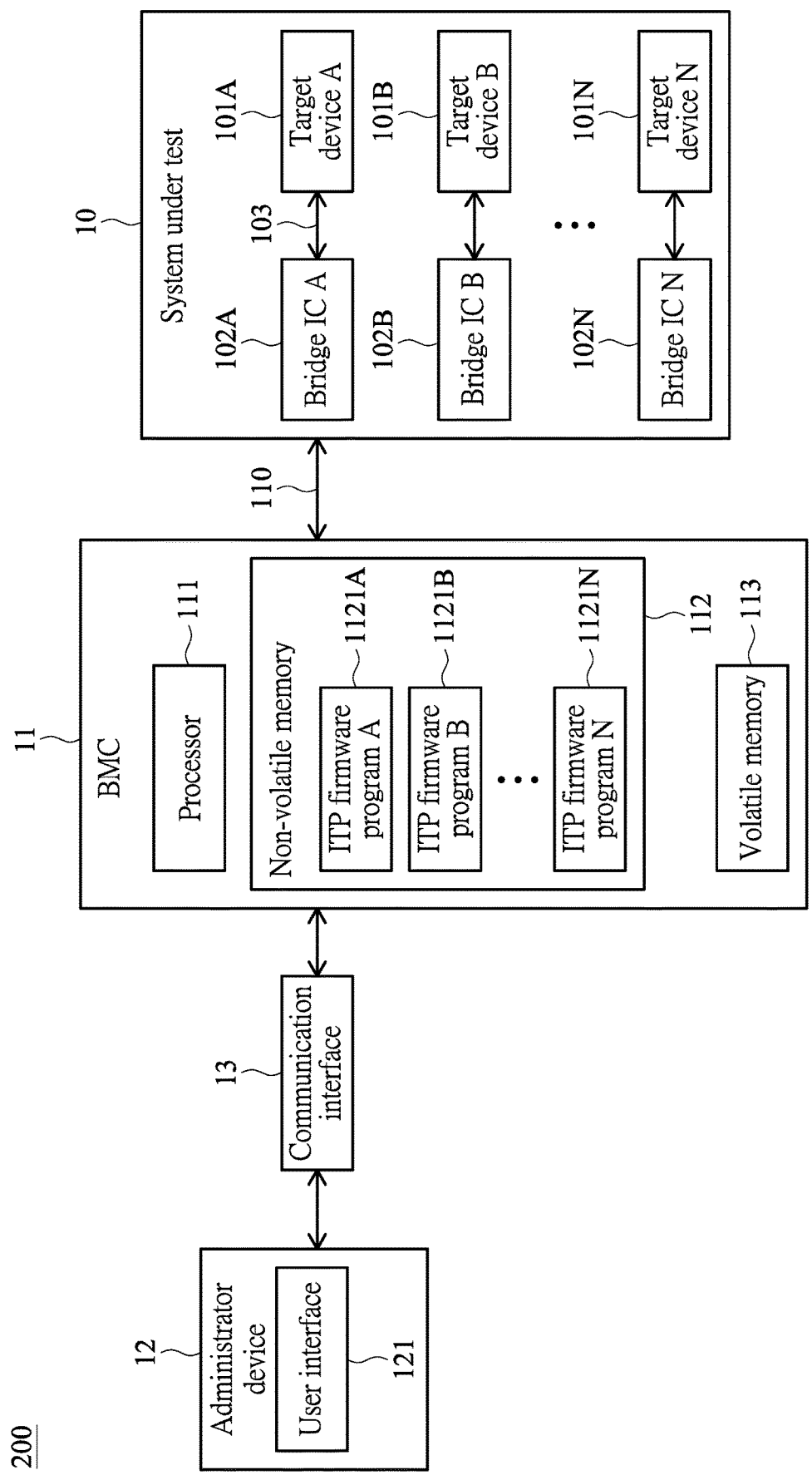
FIG. 2 shows a block diagram illustrating a monitoring system according to a second embodiment of the present invention.

FIG. 2 shows a block diagram illustrating a monitoring system 200 according to a second embodiment of the present invention. In the embodiment, a plurality of target devices 101, for example, a target device A (101A), a target device B (101B) through a target device N (101N), are integrated into the system under test 10. The system under test 10 may include a plurality of bridge integrated circuits (BICs), for example, a BIC A (102A), a BIC B (102B) through a BIC N (102N), which respectively correspond to the target device A (101A), the target device B (101B) through the target device N (101N), and respectively correspond to associated Internet Protocol (IP) addresses. The bridge ICs 102A/102B/102N may be electrically connected between the corresponding target devices 101 and the BMC 11, and may act as interfaces therebetween. Inter-board communication buses 103 may be respectively disposed between the target devices 101 and the bridge ICs 102A/102B/102N, and may be configured to transfer data between the target devices 101 and the bridge ICs 102A/102B/102N. In one example, the inter-board communication bus 103 may include, but not limited to, Inter-Integrated Circuit (I2C or $I^2C$) as mentioned above. In another example, the inter-board communication bus 103 may adopt Joint Test Action Group (JTAG) protocol.

In the embodiment, a plurality of ITP firmware programs 1121 may be integrated and stored in the non-volatile memory 112. The plurality of ITP firmware programs 1121 may, for example, include an ITP firmware program A (1121A), an ITP firmware program B (1121B) through an ITP firmware program N (1121N), which respectively correspond to the target device A (101A), the target device B (101B) through the target device N (101N), and respectively correspond to the BIC A (102A), the BIC B (102B) through the BIC N (102N).

In the embodiment, the ITP firmware programs 1121 may be stored in the non-volatile memory 112 of the BMC 11 before leaving the factory. The corresponding ITP firmware program 1121 may be activated or enabled in either software or hardware manner before executing corresponding monitor. Similar to the first embodiment, in one example, the administrator device 12 may issue a command to the BMC 11 via the communication interface 13 to activate the corresponding ITP firmware program 1121. In another example, the system under test 10 or the BMC 11 may activate the corresponding ITP firmware program 1121 in either software or hardware manner. In a further example, the corresponding ITP firmware program 1121 may be transmitted to and stored in the non-volatile memory 112 or the volatile memory 113 after leaving the factory (or when in use).

Figure 3:
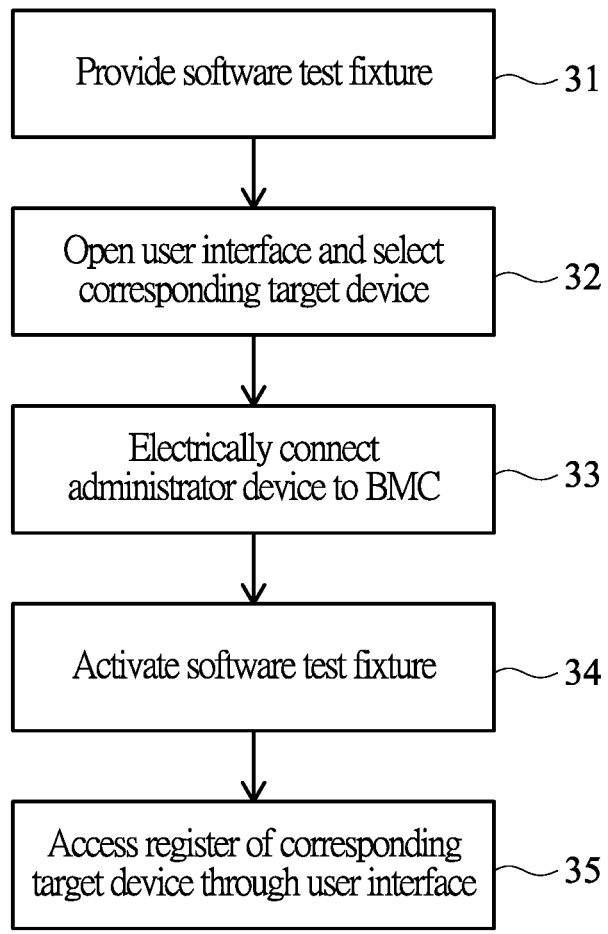
FIG. 3 shows a flow diagram illustrating a monitoring method according to one embodiment of the present invention.

FIG. 3 shows a flow diagram illustrating a monitoring method 300 according to one embodiment of the present invention. In step 31, a software test fixture corresponding to an associated target device 101 in the system under test 10 is firstly provided. The software test fixture may be stored in the non-volatile memory 112 of the baseboard management controller (BMC) 11. In the embodiment, the software test fixture may include an in-target probe (ITP) firmware program 1121, used to control the corresponding target device 101 in the system under test 10 at a register level.

In step 32, a user interface (e.g., graphical user interface (GUI)) 121 may be opened on a display of the administrator device 12, through which the corresponding target device 101 may be selected. In one embodiment, the target device 101 may be selected according to associated Internet Protocol (IP) address of the corresponding bridge IC (102A/102B/102N).

In step 33, the administrator device 12 may be electrically connected to the BMC 11 via the communication interface 13. In the embodiment, the communication interface 13 may include a computer network such as the Internet. The computer network may include a wired network, a wireless network or their combination.

In step 34, the software test fixture (stored in the non-volatile memory 112 of the BMC 11) may be activated or enabled. In the embodiment, the administrator device 12 may issue a command to the BMC 11 via the communication interface 13 to activate the ITP firmware program 1121.

In step 35, a register, a program counter (PC) and/or an instruction of the corresponding target device 101 may be accessed through the user interface (e.g., graphical user interface (GUI)) 121 (of the administrator device 12). As stated above, the software test fixture of the embodiment may act as a virtual test fixture used to remotely monitor and control the target device 101 of the system under test 10. In other words, when monitoring the target device 101, the monitoring method 300 of the embodiment includes no physical or hardware test fixture. Accordingly, the debug results individually made may be consistent, and the system under test 10 may be monitored at less time and lower cost.

Although specific embodiments have been illustrated and described, it will be appreciated by those skilled in the art that various modifications may be made without departing from the scope of the present invention, which is intended to be limited solely by the appended claims.

What is claimed is:

1. A monitoring system, comprising:
    a baseboard management controller (BMC) disposed on a same baseboard as a system under test including a plurality of target devices;
    an administrator device electrically connected to the BMC;
    a software test fixture stored in the BMC, the software test fixture including a plurality of in-target probe (ITP) firmware programs each generating an electrical signal, which is transferred to a corresponding target device of the system under test to access a register of the corresponding target device; and
    a plurality of bridge integrated circuits each being connected between the BMC and the corresponding target device, each bridge integrated circuit having an associated Internet Protocol (IP) address used to select the corresponding target device;
    wherein the administrator device updates firmware of the system under test according to a monitoring result of the system under test.

2. The monitoring system of claim 1, wherein the BMC conforms to Intelligent Platform Management Interface (IPMI) protocol.

3. The monitoring system of claim 1, further comprising an inter-board communication bus disposed between the BMC and the system under test.

4. The monitoring system of claim 1, further comprising a communication interface that electrically connects the administrator device to the BMC.

5. The monitoring system of claim 4, wherein the communication interface comprises a computer network.

6. The monitoring system of claim 1, wherein the BMC comprises:
    a processor;
    a non-volatile memory that stores the software test fixture; and
    a volatile memory that temporarily stores an executed result from the processor or received data.

7. The monitoring system of claim 1, wherein the software test fixture is activated to monitor the corresponding target device.

8. The monitoring system of claim 7, wherein the administrator device issues a command to the BMC to activate the software test fixture.

9. The monitoring system of claim 1, wherein the administrator device comprises a user interface that displays content of the register of the corresponding target device under monitor.

10. The monitoring system of claim 1, wherein the plurality of target devices each comprises an integrated circuit.

11. A monitoring method, comprising:
    providing a software test fixture including a plurality of in-target probe (ITP) firmware programs each being associated with a corresponding target device of a plurality of target devices of a system under test, the software test fixture being stored in a baseboard management controller (BMC);
    opening a user interface of an administrator device and selecting the corresponding target device;
    electrically connecting the administrator device to the BMC;
    activating the software test fixture;
    accessing a register of the corresponding target device through the user interface; and
    the administrator device updating firmware of the system under test according to a monitoring result of the system under test;
    wherein the administrator device selects the corresponding target device according to an Internet Protocol (IP) address of an associated bridge integrated circuit of a plurality of bridge integrated circuits.

12. The method of claim 11, wherein the software test fixture is stored in a non-volatile memory of the BMC.

13. The method of claim 11, wherein the administrator device is electrically connected to the BMC via a computer network.

14. The method of claim 11, wherein the administrator device activates the software test fixture by issuing a command to the BMC.

15. The method of claim 11, wherein the BMC conforms to Intelligent Platform Management Interface (IPMI) protocol.

16. The method of claim 11, wherein the BMC is disposed on a same baseboard as the system under test.

17. The method of claim 11, wherein the software test fixture generates an electrical signal, which is transferred to the corresponding target device of the system under test to access the register of the corresponding target device.

* * * * *